United States Patent [19]

Kisaka et al.

[11] Patent Number: 5,726,823
[45] Date of Patent: Mar. 10, 1998

[54] METHOD OF DETECTING POSITIONING OF A MAGNETIC HEAD, AND A MAGNETIC DISK DEVICE

[75] Inventors: Masashi Kisaka, Yokohama; Isao Yoneda, Sagamihara, both of Japan

[73] Assignee: International business Machines Corporation, Armonk, N.Y.

[21] Appl. No.: 636,789

[22] Filed: Apr. 22, 1996

Related U.S. Application Data

[63] Continuation of Ser. No. 276,662, Jul. 18, 1994, abandoned.

[30] Foreign Application Priority Data

Jul. 19, 1993 [JP] Japan ................. 5-178099

[51] Int. Cl.$^6$ ................................. G11B 5/596
[52] U.S. Cl. ................... 360/77.08; 360/78.14
[58] Field of Search ..................... 360/75, 77.01, 360/77.02, 77.06, 77.14, 78.14, 77.07, 77.08, 77.04

[56] References Cited

U.S. PATENT DOCUMENTS

| | | | |
|---|---|---|---|
| 4,669,004 | 5/1987 | Moon et al. | 360/53 |
| 4,912,576 | 3/1990 | Janz | 360/77.07 |
| 5,003,412 | 3/1991 | Bizjak et al. | 360/77.01 |
| 5,268,803 | 12/1993 | Sugita et al. | 360/77.08 |
| 5,321,557 | 6/1994 | Shimotashiro et al. | 360/77.14 |
| 5,335,123 | 8/1994 | Shimizu et al. | 360/77.05 |
| 5,523,902 | 6/1996 | Pederson | 360/78.14 |

FOREIGN PATENT DOCUMENTS 4353679 12/1992 Japan ................. G11B 21/10

Primary Examiner—Aristotelis M. Psitos
Assistant Examiner—Regina Y. Neal
Attorney, Agent, or Firm—Matthew J. Bussan; Karuna Ojanen; Merchant, Gould, Smith, Edell, Welter & Schmidt

[57] ABSTRACT

A method and apparatus for simply detecting the magnetic head position over a wide range. A magnetic disk has recorded thereon a plurality of data tracks 54 formed along the radial direction (arrow B), and burst pattern rows A, B, C, and D. Signal recording areas 50a and 50b of pattern rows A and B are arranged in a staggered manner, their end sides along the radial direction corresponding to respective widthwise central portions of tracks 54. Signal recording areas 50c and 50d of pattern rows C and D are also arranged in a staggered manner, their end sides along the radial direction corresponding to respective boundaries of tracks 54. Based on signals A, B, C, and D obtained by moving the magnetic head and reading each pattern row, data SA representing signal A/(A+B) and data SC representing signal C/(C+D) are generated. By detecting the offset of data SC for every predetermined period of time, and using each portion, which varies linearly with respect to the movement of magnetic head, of data SA, data SA+SC−offset, and data SA−SC+offset, the position of the magnetic head is detected.

4 Claims, 13 Drawing Sheets

METHOD OF DETECTING POSITIONING OF A MAGNETIC HEAD, AND A MAGNETIC DISK DEVICE

This application is a continuation of application Ser. No. 08/276,662, filed Jul. 18, 1994 and now abandoned.

BACKGROUND OF THE INVENTION

1. Field of the Invention

The present invention relates to a method of detecting a position of a magnetic head, and to magnetic disk devices, and more particularly, to a method for detecting a position of a magnetic head by recording burst patterns on a magnetic disk and a magnetic disk device employing the method for detecting the magnetic head position.

2. Description of the Prior Art

A magnetic disk, such as the hard disk and flexible disk, has a plurality of data tracks formed as concentric circles. To read or write information from or to the magnetic disk, a magnetic head is moved along the radius of the magnetic disk and aligned with a particular data track (often called seek operation), then information is read from or written into that particular data track. Positioning of the magnetic head for aligning it with a particular data track is achieved by reading burst patterns recorded consecutively along the radial direction of the magnetic disk, as described below.

FIG. 10(A) shows partially an example of typical burst patterns recorded on the magnetic disk. In FIG. 10(A), the magnetic disk is rotated along the circumferential direction (arrow C) while the magnetic head (not shown) is moved in the radial direction (arrow D). The magnetic disk has a plurality of data tracks 200A, 200B, 200C, 200D, ... formed in a concentric pattern on which data is recorded, and has a burst pattern 202 recorded along radial direction of the magnetic disk. Burst pattern 202 consists of two rows of burst patterns: row A formed with areas 204A, 204B, 204C, ... arranged along the radial direction on which area signals are recorded, and similar row B formed with areas 206A, 206B, ... arranged along the radial direction on which area signals are recorded.

Each area which constitutes the burst pattern row is considered to have a dimension, along the radial direction of the magnetic disk, which is equal to a pitch P of the data track, and is arranged in a staggered fashion along radial direction of the magnetic disk so that each of its ends along the radial direction is aligned with the central portion of the data track. When the magnetic head is moved along the radial direction of the magnetic disk while reading the burst pattern, a varying position detection signal is obtained, as shown in FIG. 10(B). This position detection signal is the one obtained by dividing a signal given by reading burst pattern row A (referred to as signal A) by a signal obtained by adding to signal A a signal obtained by reading burst pattern row B (referred to as signal B), i.e., signal A/(A+B). In FIG. 10(B), the abscissa represents the position of the magnetic head, more precisely, the center in the longitudinal direction of the gap formed in the magnetic head.

As shown in FIG. 10(B), the position detection signal varies linearly as the gap center passes in the vicinity of the widthwise central portion of data track 200B (arrow D). The same applies to the case of passing through the center across the width of other data tracks. Therefore, the level of the position detection signal allows the position of the gap, that is the magnetic head position to be determined, and the level of the position signal allows the magnetic head to be positioned so that the gap center is located in the center across the width of the data track.

In the position detection signal shown in FIG. 10(B), there is a period of a constant level when the gap center is located near the boundary of the data track. This occurs because the longitudinal dimension of the gap is shorter than the width of the data track. This period is called a "dead zone" since the position of the magnetic head cannot be determined in the period. When the gap center is located at the boundary between data track 200A and 200B, the level of the position detection signal does not indicate "0" despite of the gap being out of alignment with the signal-recorded area of burst pattern row A. This level is referred to as "offset."

In recent years there has been suggested a magnetic head for reading information by using magnetoresistive elements (referred to as MR elements). The MR element utilizes a magnetoresistive effect, i.e., when a semiconductor is placed in a magnetic field, the direction of travel of electrons or holes varies due to the field, thus the travel path being lengthened, resulting in an increased resistance. The magnetic head employing the MR elements for read operation also employs coils for write operation, and has separate gaps for reading and writing. The gap for reading is made longitudinally shorter in order to improve the error rate. Moreover, for the purpose of physical arrangement, the longitudinal center of the gap for reading is offset from the central portion of the gap for writing.

To write information, it is therefore necessary to locate the magnetic head at a position where the central portion of the gap for writing is aligned with that of the width of the data track, i.e., where the central portion of the gap for reading is offset from the widthwise center of the data track. As described before, since the longitudinal dimension of the gap for reading is shortened, however, the period of dead zone is longer, and the linear area becomes insufficient in which the position detection signal varies linearly with respect to the movement of the magnetic head. Thus there has been a problem that the range within which the position of the magnetic head can be detected is very narrow.

To solve the problem described above, JP-A-4-353679 suggests a method for obtaining the position detection signal which varies linearly over a wide range with respect to the movement of the magnetic head. The method requires a burst pattern consisting of four rows of special burst pattern to be recorded on the magnetic disk. The pattern rows have a length in each area along the radial direction of the magnetic disk which is shorter than the data track pitch. The burst pattern provides four types of signals which are used in operations to obtain a total of eight types of signals which are switched and used as a position detection signal in accordance with the position of the magnetic head.

Such a method is time-consuming, however, in determining signal switching and operations. In addition, since the method requires a special burst pattern to be recorded which has a length in each area along the radial direction of the magnetic disk which is shorter than the data track pitch, it is also time-consuming and troublesome to record the burst pattern. The publication cited above teaches that by adding a predetermined bias value to or subtracting it from the obtained signal, a position detection signal is formed which has removed the offset of each signal and varies linearly with respect to the movement of the magnetic head. However, since the offset varies with the voltage applied to the magnetic head and with ambient temperatures, even when a fixed value as that of such bias is provided, the position detection signal will have a varying point, so-called inflection point, where signals to be used as the position detection signal are switched.

SUMMARY OF THE INVENTION

Therefore, it is a primary object of the present invention to provide a method for detecting a position of a magnetic head over a wide range with a simple process. It is another object of the present invention to provide a magnetic disk device which is readily manufactured and capable of detecting a position of a magnetic head over a wide range with a simple process.

To accomplish the aforementioned and other objects, the present invention uses a magnetic disk on which first and second burst patterns are recorded, and a magnetic head which is at least capable of reading signals recorded on a data track of the magnetic disk. The first burst pattern is formed of a plurality of recording areas arranged along a predetermined direction. Each of the recording areas is formed of a signal-recorded area defined by first and second sides. The first side is so arranged as to correspond to a vicinity of the central portion of a first data track formed along the predetermined direction. The second side is opposite to the first side and is so located as to correspond to a vicinity of the central portion, along the predetermined direction, of a second data track adjacent to the first data track. The second burst pattern is formed of a plurality of recording areas arranged along the predetermined direction whose positions are offset by respective predetermined amounts along the predetermined direction relative to the first burst pattern. The magnetic disk and the magnetic head are relatively moved along the predetermined direction and a position of the magnetic head is detected by using: a portion, which varies linearly with respect to the relative movement, of a first signal being output from the magnetic head in response to the first burst pattern; a portion, which varies linearly with respect to the relative movement, of a signal generated by adding the first signal to a second signal being output from the magnetic head in response to the second burst pattern; and a portion, which varies linearly with respect to said relative movement, of a signal generated by subtracting the second signal from the first signal.

In the present invention, it is desired to detect as an offset the minimum value of a level of at least one of the first and second signals whose level varies with the relative movement between the magnetic disk and the magnetic head. For the signal generated by adding the second signal to the first signal, it is desirable to subtract the detected offset, and for the signal generated by subtracting the second signal from the first signal, it is desirable to add the detected signal.

In the present invention, a magnetic disk having a plurality of data tracks formed along a predetermined direction and first and second burst patterns, is moved relative to a magnetic-head along said predetermined direction. The magnetic head then provides a signal in response to each burst pattern. Since each of the first and second sides of the recording area of the first burst pattern corresponds to a vicinity of the central portion of the data track along the predetermined direction, the first signal corresponding to the first burst pattern which is being output from the magnetic head by the relative movement varies linearly with respect to the relative movement when the magnetic head passes in the vicinity of the central portion of the data track, and becomes stable (so-called dead zone) when the magnetic head passes in the vicinity of the boundary of an adjacent data track.

Since the recording area of the second burst pattern is offset by a predetermined amount along the predetermined direction relative to the recording area of the first burst pattern, the second signal varies linearly with respect to the relative movement when the magnetic head passes, for example, the boundary, or its vicinity, of an adjacent data track, and remains unchanged (dead zone) when the magnetic head passes in the vicinity of the central portion of the data track. Thus, the first signal and the second signal differ in the period of linear variation relative to the relative movement between the magnetic disk and magnetic head. That is, when the level of one signal is constant, the level of another varies linearly with respect to the relative movement.

In the present invention, therefore, the magnetic head position is detected by using a portion of the first signal which varies linearly with respect to the relative movement; a portion, which varies linearly with respect to the relative movement, of a signal obtained by adding the second signal to the first signal; and a portion, which varies linearly with respect to the relative movement, of a signal obtained by subtracting the second signal from the first signal. The first signal, the signal obtained by adding the second signal to the first signal, and the signal obtained by subtracting the second signal from the first signal differ in the portion which varies linearly when the magnetic disk is relatively moved with respect to the magnetic head. Therefore, the position of the magnetic head can be detected over a wide range based upon the linearly varying portion of each of the three signals.

In positioning the magnetic head while detecting the magnetic head position, when the target position of movement of the magnetic head corresponds to any linear portion of the three signals, for example, the magnetic head can be positioned at the target by moving the head while a corresponding signal is being monitored.

In the present invention, only two signals are directly obtained from the magnetic head, i.e., the first and second signals, and the magnetic head position is detected by using three signals, that is, the first signal and two signals being indirectly obtained by addition and subtraction between the two directly obtained signals. Therefore, it not necessary to perform time-consuming processing as in JP-A-4-353679, and a simple process allows detection of the magnetic head position. Furthermore, the present invention does not require such a magnetic disk as having special burst patterns recorded, as described in JP-A-4-353679, facilitating recording of the burst pattern on the magnetic disk for applying the present invention.

In the present invention, preferably the minimum value of a level of at least one of the first and second signals is detected as an offset. For the signal obtained by adding the second signal to the first signal, the detected offset is subtracted, and for the signal obtained by subtracting the second signal from the first signal, the detected offset is added. Each of the first and second signals yields an offset. For the signal obtained by adding the second signal to the first signal includes the offset of the first signal and the offset of the second signal. For the signal obtained by subtracting the second signal from the first signal, the first signal offset is canceled by the second signal offset.

Therefore, for the levels of the three signals as the magnetic head is positioned at the predetermined position, the first signal and the signal generated by adding the second signal to the first signal have a displacement equivalent to the offset occurring in the first or second signal. The same displacement is found in the first signal and the signal generated by subtracting the second signal from the first signal. Thus, as described above, by detecting the offset, and for the signal obtained by adding the second signal to the first signal, subtracting the offset, and for the signal obtained by subtracting the second signal from the first signal, adding the offset, the displacement can be corrected. Thus, the three signals permit a position detection signal without the inflection point to be obtained.

It is preferable to detect the offset periodically or for every specified timing (e.g., when power is turned on), since the magnitude of the offset produced in the first and second signals varies with changes in the voltage applied to the magnetic head and amplifier and in ambient temperatures.

The present invention in a preferred embodiment comprises a magnetic disk on which first and second burst patterns are recorded, a magnetic head which is at least capable of reading signals recorded on a data track of the magnetic disk, and means for detecting a position of the magnetic head. The first burst pattern is formed of a plurality of recording areas arranged along a predetermined direction. Each of the recording areas is formed of a signal-recorded area defined by first and second sides. The first side is so arranged as to correspond to a vicinity of the central portion of a first data track along the predetermined direction. The second side is opposite to the first side and is so arranged as to correspond to a vicinity of the central portion of a second data track adjacent to the first data track along the predetermined direction. The second burst pattern is formed of a plurality of recording areas arranged along the predetermined direction whose positions are offset by respective predetermined amounts along the predetermined direction relative to the first burst pattern. The magnetic disk and the magnetic head are relatively moved along the predetermined direction, and the detection means detects a position of the magnetic head by using: a portion, which varies linearly with respect to the relative movement, of a first signal being output from the magnetic head in response to the first burst pattern; a portion, which varies linearly with respect to the relative movement, of a signal generated by adding the first signal to a second signal being output from the magnetic head in response to the second burst pattern; and a portion, which varies linearly with respect to the relative movement, of a signal generated by subtracting the second signal from the first signal.

In this preferred embodiment of the present invention, it is desired to further include means for detecting as an offset the minimum value of a level of at least one of the first and second signals, the level varying in response to the relative movement between the magnetic disk and the magnetic head. For the signal generated by adding the second signal to the first signal, the detection means subtracts the detected offset, and for the signal generated by subtracting the second signal from the first signal, the detection means adds said detected signal.

In this preferred embodiment of the present invention, a magnetic disk is used which has recorded thereon a first burst pattern formed of a plurality of recording areas arranged along a predetermined direction, each of the recording areas having signal-recorded area defined by a first side so located as to correspond to a vicinity of the central portion of a first data track along the predetermined direction and a second side opposed to the first side and arranged so as to correspond to a vicinity of the central portion of a second data track adjacent to the first data track along the predetermined direction, and a second burst pattern formed of a plurality of recording areas arranged along the predetermined direction, each of the recording areas being offset by a predetermined amount along the predetermined direction relative to the recording area of the first burst pattern. The magnetic disk is moved relative to the magnetic head along the predetermined direction by a position detector means. A position of the magnetic head is detected by using: a portion, which varies linearly with respect to the relative movement, of a first signal being output from the magnetic head in response to the first burst pattern; a portion, which varies linearly with respect to said relative movement, of a signal formed by adding the first signal to a second signal being output from the magnetic head in response to the second burst pattern; and a portion, which varies linearly with respect to said relative movement, of a signal formed by subtracting the second signal from the first signal. Thus, allowing the magnetic head position to be detected in a wide range with a simple process. Moreover, as this preferred embodiment of the present invention is applied, the first and second burst pattern can be readily recorded on the magnetic disk, thus fabrication being facilitated and device costs reduced.

In this preferred embodiment of the invention, by further providing a means for detecting as an offset the minimum value of a level of at least one of the first and second signals whose level varies in accordance with the relative movement between the magnetic disk and magnetic head, subtracting the offset being detected by the offset detector means for the signal obtained by adding the second signal to the first signal, and adding the offset for the signal obtained by subtracting the second signal from the first signal, the level displacement which occurs in the three signals can be corrected, i.e., the first signal, the signal obtained by adding the second signal to the first signal, and the signal obtained by subtracting the second signal from the first signal. Thus, the three signals give a position detection signal without the inflection point.

DESCRIPTION OF THE PREFERRED EMBODIMENT

Figure 1:
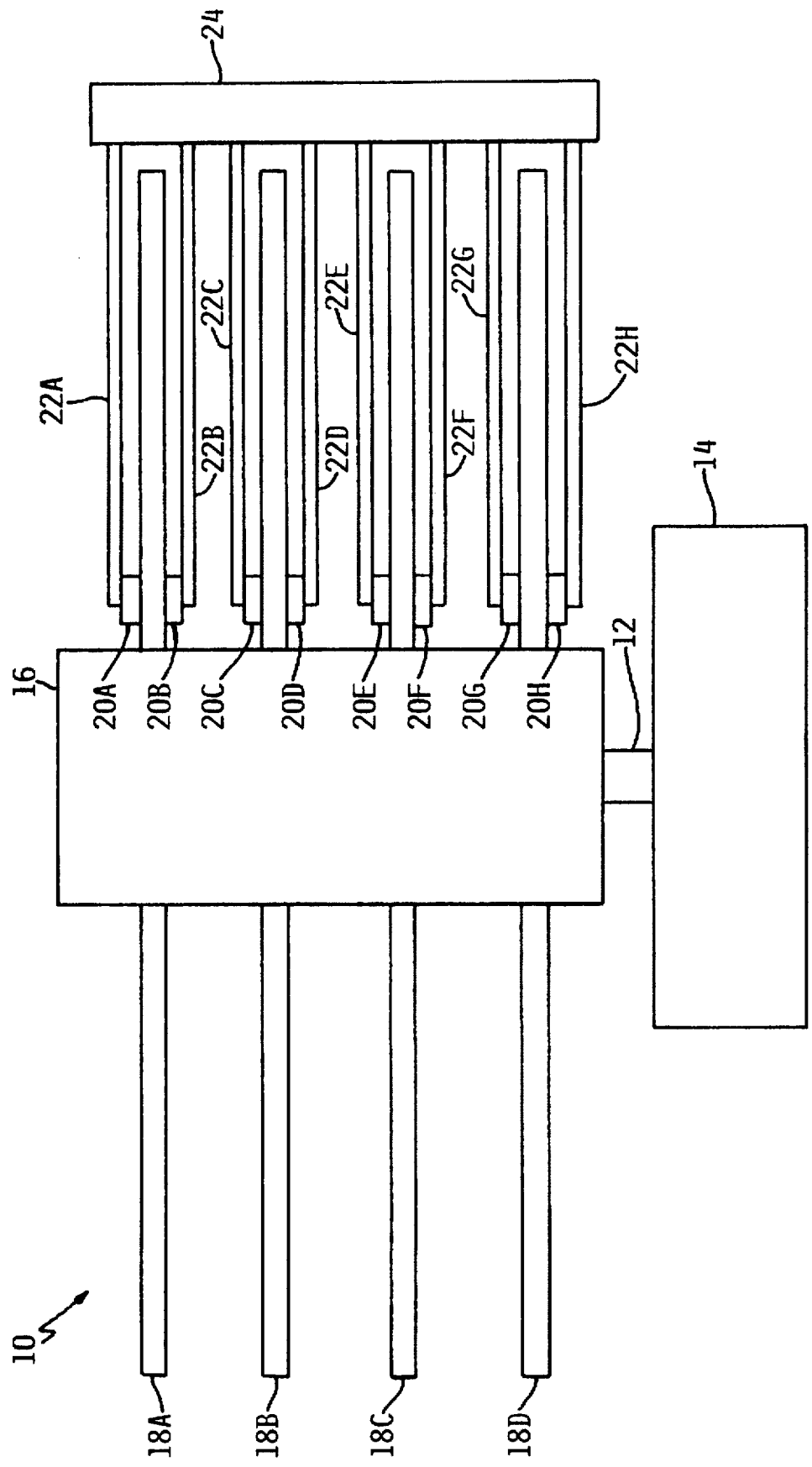
FIG. 1 is a schematic diagram of a hard disk device relating to the present invention.

A preferred embodiment of the present invention will now be described with reference to the figures. FIG. 1 shows a hard disk device 10 relating to the present invention. Hard disk 10 includes a drive 14 for rotating shaft 12 at high speeds. A cylindrical support 16 is attached to shaft 12 so that their axes are aligned. On the circumference of support 16, disks 18A, 18B, 18C, and 18D are attached a predetermined distance apart from each other.

Disks 18A to 18D are made cylindrical with a predetermined thickness, each of which is formed of hard material, with both surfaces being coated with magnetic material to be used as recording surfaces. At the central portion of each of disks 18A to 18D, a hole is formed which has virtually the same diameter as the outer diameter of support 16. Support 16 is inserted into the hole, and disks 18A to 18D are fixed at the circumference of support 16. Therefore, when shaft 12 is rotated by drive 14, disks 18A to 18D are rotated together with support 16.

Figure 2:
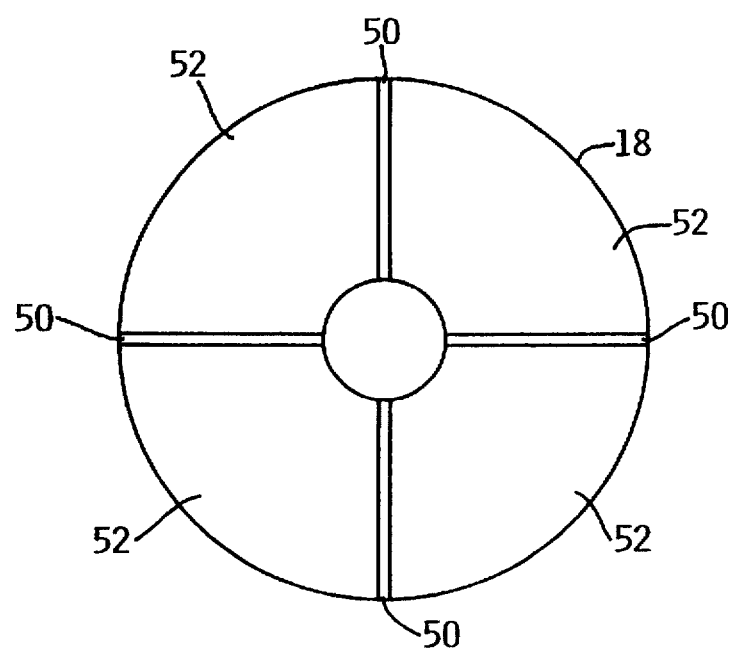
FIG. 2 is a top view of a disk indicating the burst pattern recording area.
Figure 3:
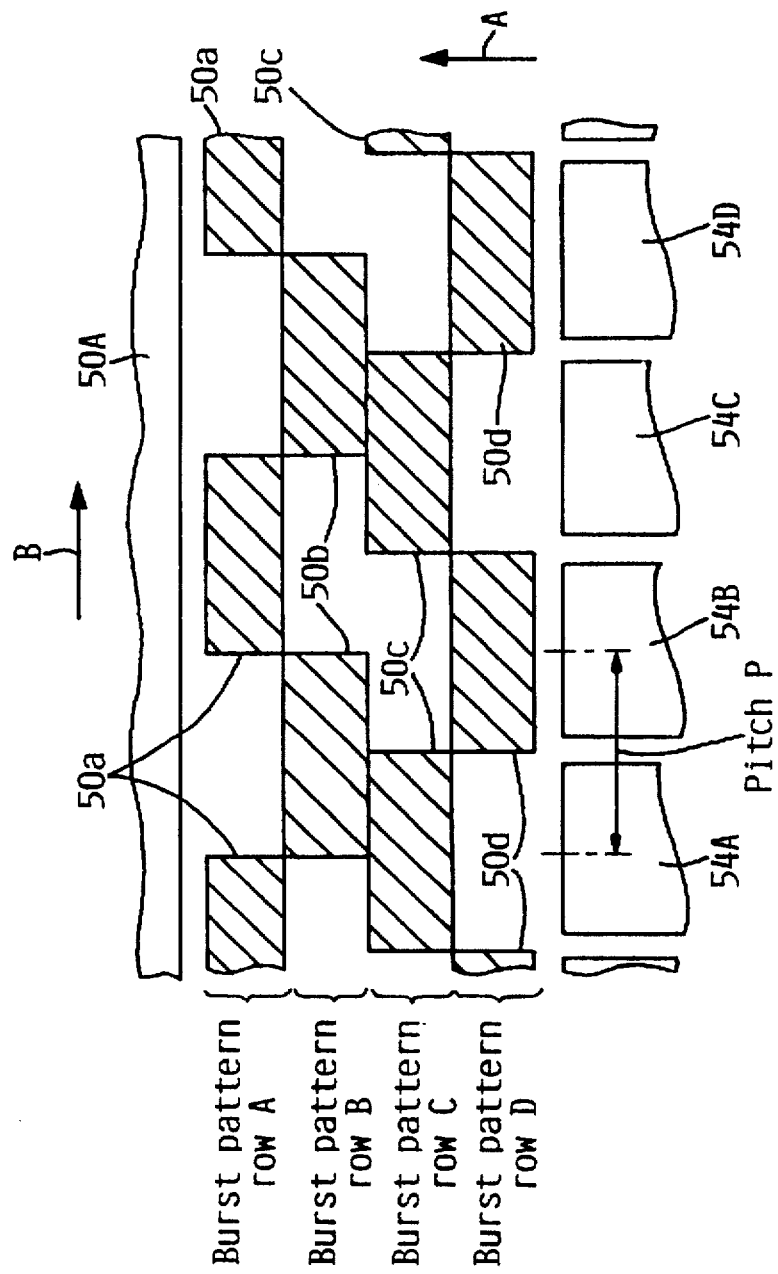
FIG. 3 is a top view of data tracks and burst patterns recorded in the burst pattern recording area.

On each recording surface of disks 18A to 18D, a plurality of burst pattern recording areas 50 are formed radially along the radial direction of disk 18 and the remaining areas are taken as data track areas 52 as shown in FIG. 2. In burst pattern recording areas 50, burst patterns are formed with signals recorded in a predetermined pattern. FIG. 3 shows part of burst patterns formed in burst pattern recording areas 50 and data track areas 52. In data track areas 52, a plurality of data tracks are formed concentrically at pitch P along the radial direction, some of which are shown in FIG. 3 as data tracks 54A, 54B, 54C, and 54D. Information is written in each data track along the direction of rotation of disk 18 (arrow A in FIG. 3) by a magnetic head which will be later described.

The burst pattern formed in burst pattern recording areas 50 consists of four burst pattern rows (A to D), each of which has signal-recorded areas (shown as hatched areas in FIG. 3), arranged along the direction of data track placement, i.e., the radial direction of disk 18. Each signal-recorded area making up each burst pattern row has a dimension along the radial direction of magnetic disk 18 and spacing between adjacent areas made equal to pitch P of data track 54.

Burst pattern rows A and B form a first burst pattern of the present invention. Signal-recorded area 50a of burst pattern row A and signal-recorded area 50b of burst pattern row B are arranged in a staggered fashion along the radial direction of disk 18, and the sides of both ends of each area along the radial direction of disk (first and second) are aligned with the widthwise central portion of data track 54 in the radial direction. By signal recording on each area, burst pattern rows A and B are formed.

Burst pattern rows C and D corresponds to the second burst pattern of the present invention. Signal-recorded area 50c of burst pattern row C and signal-recorded area 50d of burst pattern row D are placed in a staggered fashion along the radial direction of disk 18, and the sides at both ends of each area along the radial direction of the disk are aligned with the boundary between adjacent data tracks. By signal recording on each area, burst pattern rows C and D are formed. Area 50A included in burst pattern recording area 50 has a special code indicating the beginning of the pattern (e.g., an area without signal recorded of approximately 1 microsecond) and a gray code (cyclic binary code) indicating, for example, the address of each data track which are recorded relative to the data track.

Figure 4:
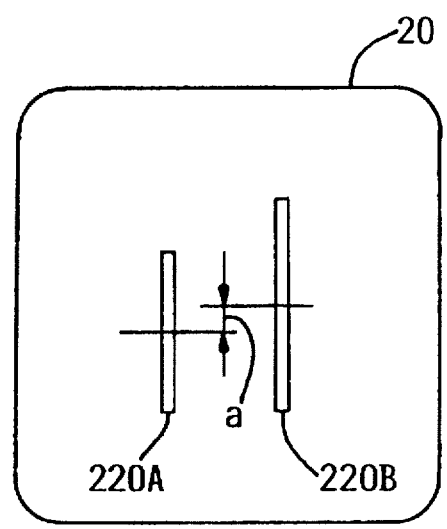
FIG. 4 is a top view of a read and write gaps formed in the magnetic head.

Hard disk device 10 contains magnetic heads 20A to 20H provided for each recording surface of disks 18A to 18D. As shown in FIG. 4, in each of magnetic heads 20A to 20H, an information read gap 20A and an information write gap 20B are formed and extend along the direction of the width of the data track. Read gap 20A is shorter than write gap 20B in the longitudinal direction, and the longitudinal center is offset with respect to the central portion of write gap 20B (displacement shown as "a" in FIG. 4).

Each of magnetic heads 20 is configured to include a read element (not shown) provided for read gap 220A for reading information by using the MR element, for example, and a write element (not shown) provided for write gap 220B for writing information using a coil, for example. Magnetic heads 20A to 20H are attached to the ends of access arms 22A to 22H, respectively, and are suspended in a slightly spaced-apart relationship (e.g., 0.1 to 0.2 micron approximately) with the corresponding recording surfaces of disks 18A to 18D. A drive 24 is attached to the end side of access arms 22A to 22H opposed to the side where magnetic heads 20 are mounted.

Drive 24 is equipped with a voice coil motor 26 (see FIG. 5), for example, provided so as to correspond to access arms 22A to 22H for moving each access arm. As voice coil motor 26 is driven by a microprocessing unit, described below, the access arm is moved so that magnetic heads 20A to 20H are moved along the radial direction of disks 18A to 18D. Magnetic heads 20A to 20H are then aligned with predetermined portions on the recording surfaces of disks 18A to 18D.

Figure 5:
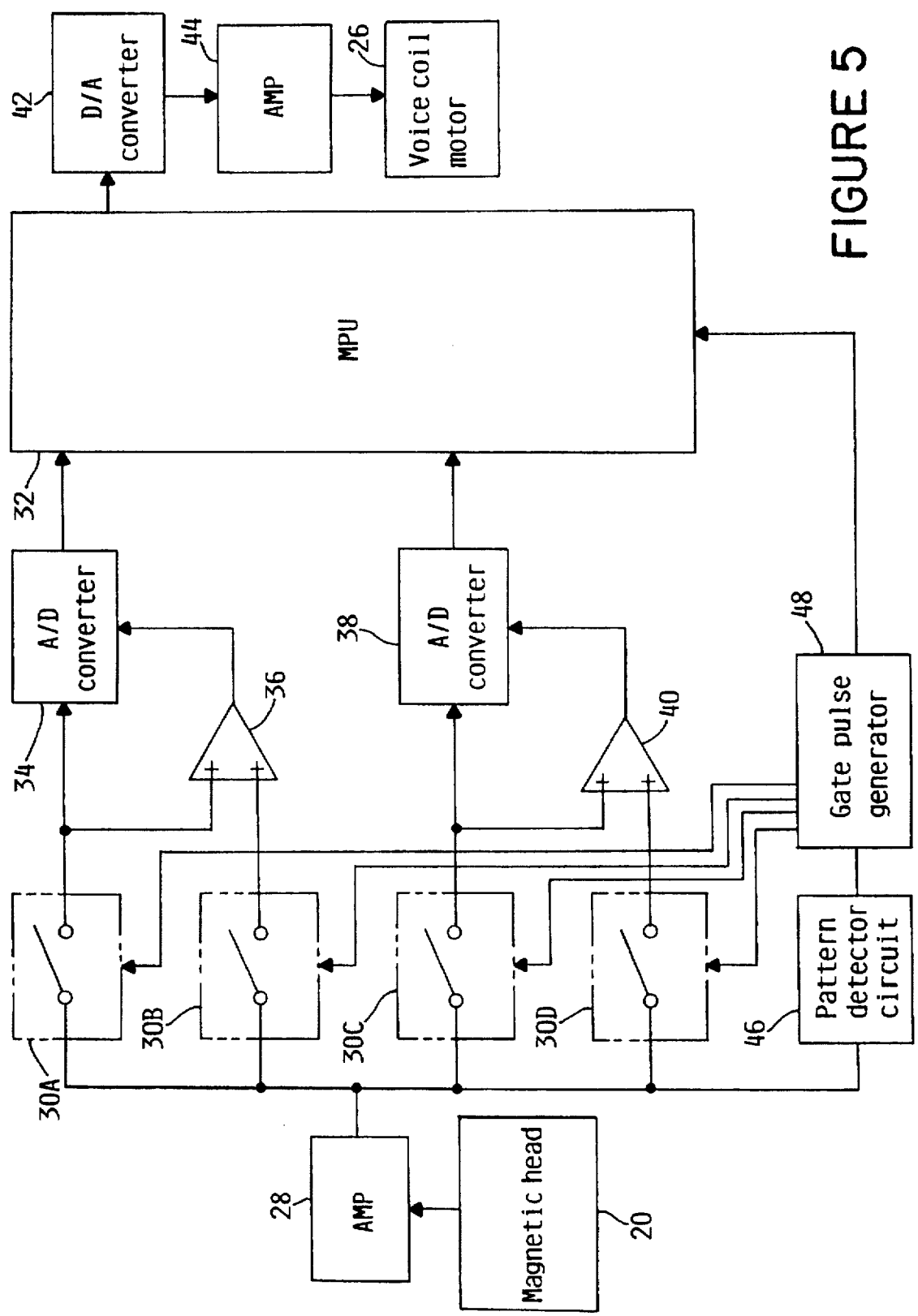
FIG. 5 is a schematic block diagram illustrating connections of the MPU, magnetic head, and their peripherals of a hard disk device.

Each magnetic head 20 is connected to a circuit as shown in FIG. 5. The signal output terminal of each magnetic head 20 is connected to the input terminal of an amplifier 28, which amplifies the signal being output from the read element of magnetic head 20. To the output terminal of amplifier 28, the terminals of switching circuits 30A, 30B, 30C, and 30D are connected in parallel. The output terminal of amplifier 28 is also connected to a gate pulse generator 48 via a pattern detector circuit 46. Gate pulse generator 48 is connected to switching circuits 30A to 30D and a microprocessing unit (referred to as MPU) 32.

In FIG. 5, although switching circuits 30A to 30D are schematically shown as switches, the device can be configured to include switching elements such as transistors. After a code indicating the beginning of a pattern has been detected by pattern detector circuit 46, gate pulse generator 48 turns on only switching circuit 30A when magnetic head 20 is aligned with burst pattern row A, allowing a signal corresponding to burst pattern row A (referred to as signal A) to be output from switching circuit 30A, and turns on only switching circuit 30B when magnetic head 20 is aligned with burst pattern row B, allowing a signal corresponding to burst pattern row B (referred to as signal B) to be output from switching circuit 30B. Similarly, gate pulse generator 48 turns on only switching circuit 30C when magnetic head 20 is aligned with burst pattern row C, allowing a signal corresponding to burst pattern row C (referred to as signal C) to be output from switching circuit 30C, and turns on only switching circuit 30D when magnetic head 30 is aligned with burst pattern row D, allowing a signal corresponding to burst pattern row D (referred to as signal D) to be output from switching circuit 30D.

The output of switching circuit 30A is branched into two lines, one of which is connected to the signal input terminal of an analog/digital converter (referred to as A/D converter) 34, the other being connected to one of two input terminals of an adder 36. The output of switching circuit 30B is connected to another of the two input terminals of adder 36. The signal input terminal of adder 36 is connected to the reference signal input terminal of A/D converter 34. Therefore, A/D converter 34 operates on, signal A+B as a reference signal which is formed by adding signal A being output from switching circuit 30A to signal B being output from switching circuit 30B, and converts signal A into a digital data output. Thus, from A/D converter 34, the data of signal A/(A+B) is output which corresponds to the first signal of the present invention.

The output of switching circuit 30C is also branched into two lines, one of which is connected to the signal input terminal of an A/D converter 38, and the other of which being connected to one of two input terminals of an adder 40. The output of switching circuit 30D is connected to another of the two input terminals of adder 40. The signal output terminal of adder 40 is connected to the reference signal input terminal of A/D converter 38. Therefore, A/D converter 38 operates on signal C+D, as a reference signal, formed by adding signal C being output from switching circuit 30C to signal D being output from switching circuit 30D, and converts signal C into digital data output. Thus, from A/D converter 38, signal C/(C+D) corresponding to the second signal of the present invention is output. The output terminals of A/D converters 34 and 38 are provided to MPU 32.

MPU 32 determines a position of magnetic head 20 by using the data being input from A/D converters 34 and 38, and outputs data for driving voice coil motor 26 when magnetic head 20 is moved to a predetermined position. This data is converted by digital/analog converter (referred to as D/A converter) 42, connected to MPU 32, into an analog signal, which is amplified by amplifier 44 connected to D/A converter 42 and applied to voice coil motor 26. This causes voice coil motor 26 to be driven, and magnetic head 20 is moved to the predetermined position.

Figure 8:
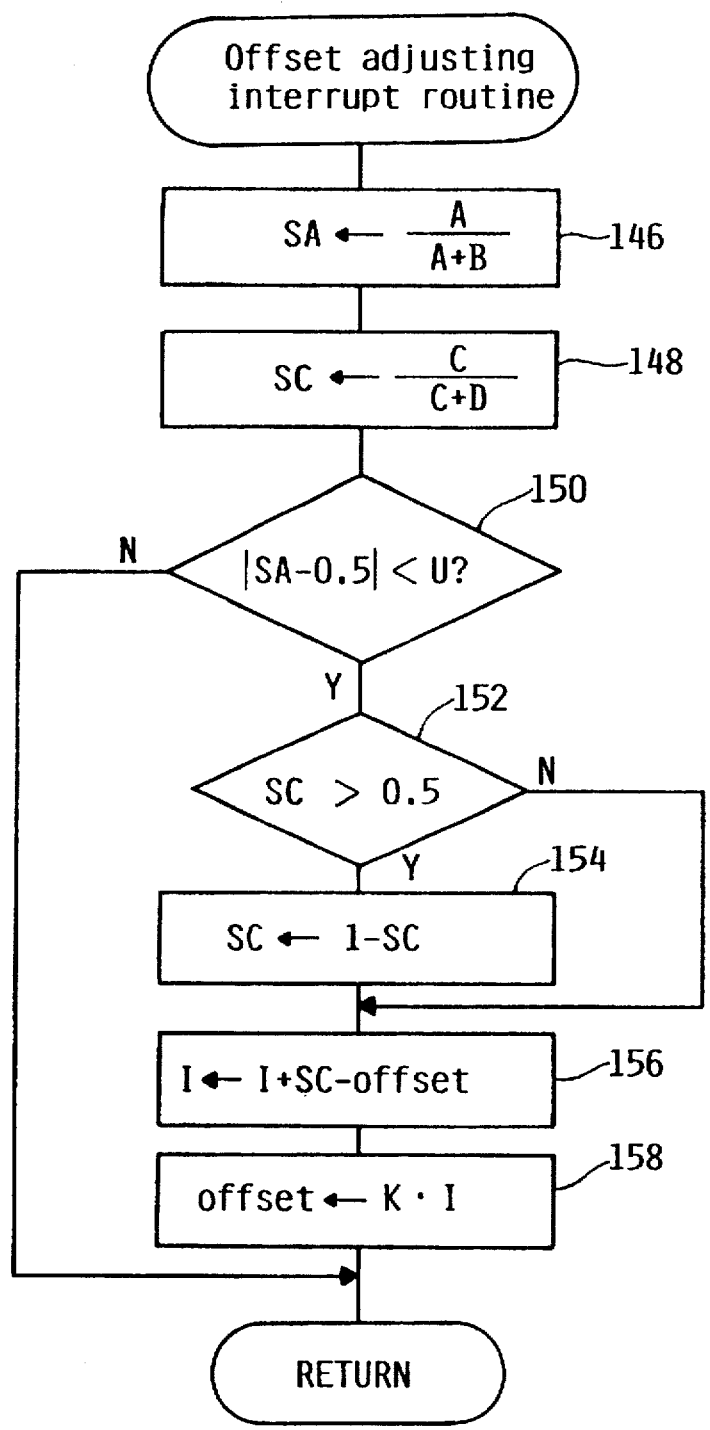
FIG. 8 is a flow diagram illustrating an offset adjustment interrupt process.

Operation of the present invention will now be described. Before describing the seek operation or track following operation of magnetic head 20 and position detection by magnetic head 20 as it performs such operations, an offset adjusting interrupt routine will be described which is executed in MPU 32 for every predetermined period of time (e.g., 87 msec.) by a timer interrupt, with reference to the flowchart shown in FIG. 8.

In step 146, the data of signal A/(A+B) being input through A/D converter 34 will be defined as data SA, and in step 148, the data of signal C/(C+D) being input through A/D converter 38 will be defined as data SC. Step 150 determines whether the absolute value of the value generated by subtracting 0.5 from data SA is smaller than predetermined value U (e.g., approximately 0.2). Since burst pattern row A has its ends of signal-recorded area aligned with the widthwise central portion of the data track as shown in FIG. 3, signal A/(A+B) varies linearly in the vicinity of the widthwise central portion of the data track, and the value of data SA becomes 0.5 when read gap 220A of magnetic head 20 is aligned with the widthwise central portion of the data track. Therefore, step 150 is answered Yes when read gap 220A of magnetic head 20 is positioned in the vicinity of the widthwise central portion of the data track.

Figure 6A:
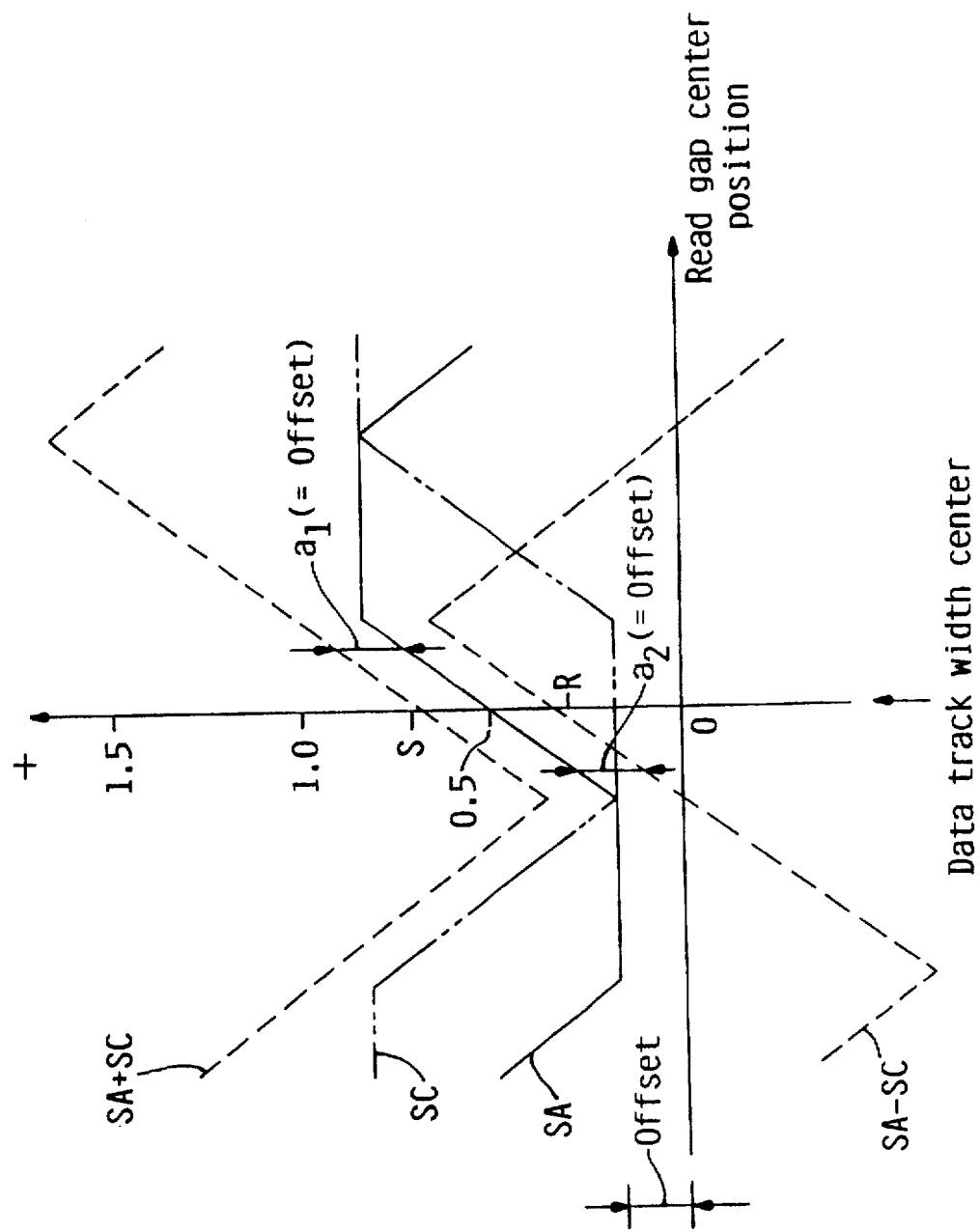
FIG. 6(A) is a diagram illustrating the variation of the value of data SA and SC with the movement of magnetic head.

If the answer to step 150 is No, no processing is made and interrupt is terminated. If the answer to step 150 is Yes, however, read gap 220A of magnetic head 20 is positioned near the widthwise central portion of the data track, and then data SC, i.e., signal C/(C+D), becomes stable at the minimum value (or maximum value) as shown in FIG. 6(A). This minimum value is equal to data SC and to the offset of data SA. Therefore, step 152 determines whether the value of data SC is larger than 0.5, i.e., whether data SC remains constant at the maximum value. If the answer to step 152 is Yes, in step 154, the value obtained by subtracting data SC from 1 is taken as data SC. This corresponds to the value of data SC being inverted with 0.5 taken as a boundary, thus the minimum value of data SC is determined.

Step 156 determines data I by using the following equation (1):

$$I = I + SC - \text{offset} \tag{1}$$

Data I and the offset data have been given initial values. These initial values are used for operations when the interrupt routine is first executed. Step 158 updates the offset data by using the following equation (2) to complete the interrupt process.

$$\text{offset} = K \times I \tag{2}$$

where K is a constant to be specified as a value of approximately 1/16 (=0.0625).

In steps 156 and 158, if the offset data is smaller than data SC, then data I will be larger to increase the value of the offset data. If the offset data is larger than data SC, then data I will be smaller, decreasing the value of the offset data. Therefore, by repeating the execution of the interrupt routine, the value of offset data coincides with (the minimum value of) data SC. That is, data I will be automatically adjusted so that it becomes a constant value.

Figure 7A:
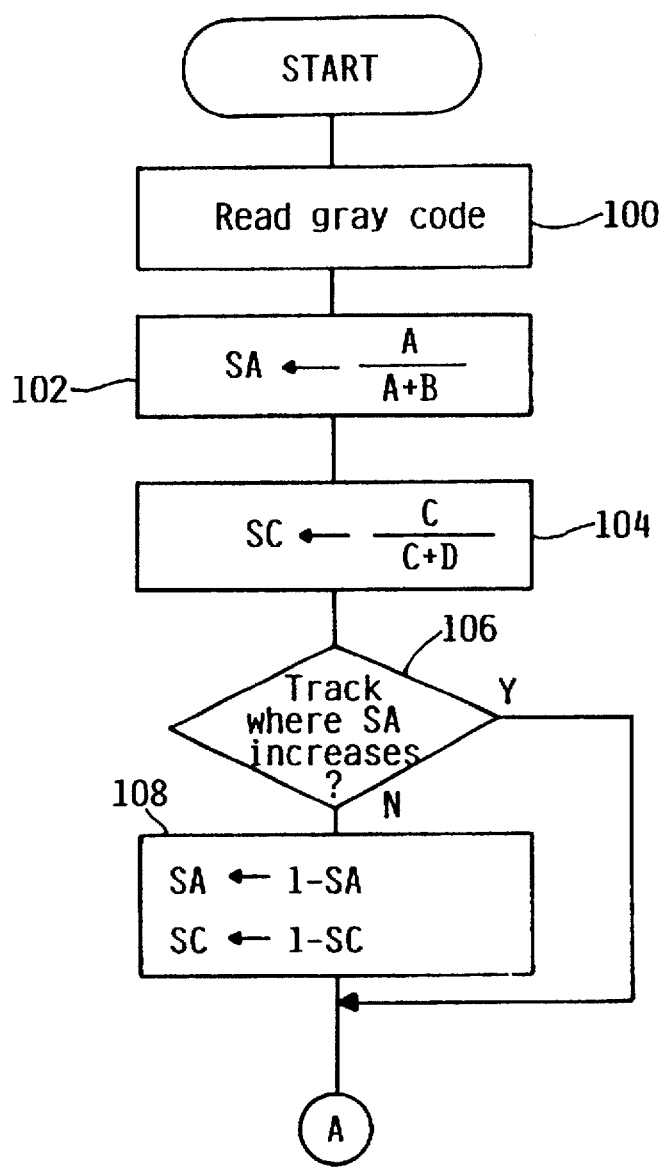
FIG. 7(A) and 7(B) is a flow diagram illustrating the process of movement of the magnetic head according to an embodiment of the present invention.
Figure 7B:
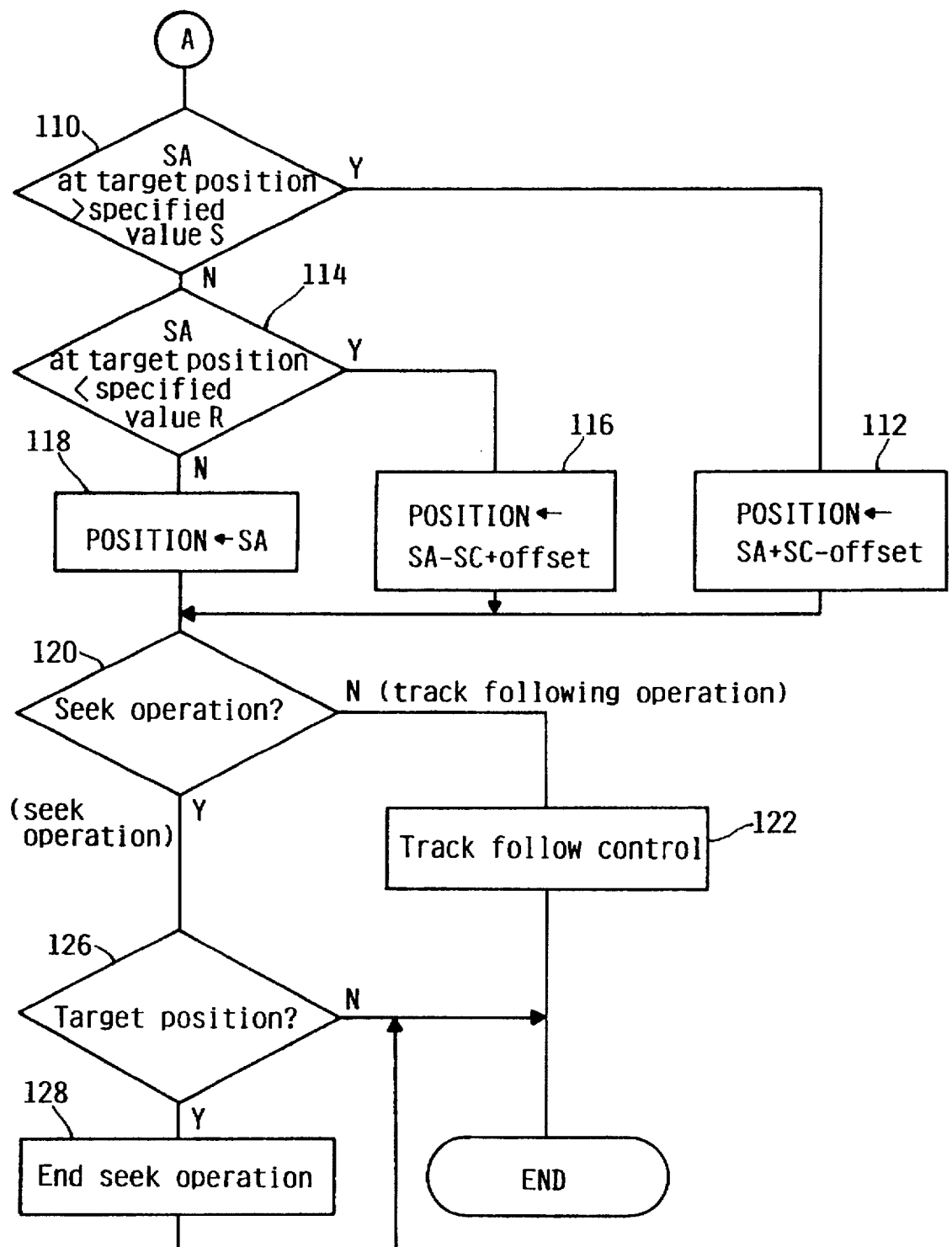

Now referring to the flowchart shown in FIGS. 7(A) and 7(B), the seek operation or track following operation of magnetic head 20 during reading information from or writing information to disk 18, and position detection by magnetic head 20 during such operations, will be described. The flowchart shown in FIGS. 7(A) and 7(B) is initiated by pattern detector circuit 46 detecting the beginning of a pattern. When an instruction is input externally (e.g., by the CPU of a computer connected to hard disk device 10) to MPU 32 for reading information from a predetermined data track of disk 18 or writing information to a predetermined data track, MPU 32 provides seek control, described below, and terminates the seek operation when a predetermined target position is reached.

Step 100 performs reading of a gray code, and steps 102 and 104 define the data of signal A/(A+B) and signal C/(C+D) being input from A/D converters 34 and 38 as data SA and data SC, respectively. Step 106 determines, from the track ID obtained from the gray code, whether the value of data SA increases or not when magnetic head 20 is moved in the direction of arrow B (FIG. 3). In FIG. 3, the tracks where the value of data SA increases are 54B and 54D. When the answer to step 106 is Yes, the process goes to step 110.

On the other hand, when a decision is made by the track ID that the position of magnetic head 20 is on track 54A or track 54C, the value of data SA decreases as the magnetic head is moved in the direction of arrow B. In this case, the decision in step 106 is No, and the process goes to step 108.

In step 108, the value generated by subtracting data SA from "1" is taken as data SA, while the value generated by subtracting data SC from "1" is taken as data SC. This corresponds to the value of data SA and SC being inverted with "0.5" taken as a boundary. Thus, after step 110, data SA and SC are so treated that data SA is considered to increase with the movement of magnetic head 20 in the direction of arrow B. Step 110 determines whether data SA at the target position of magnetic head 20 is larger than specified value S (provided that S>0.5, e.g., a value of approximately 0.7

Figure 6B:
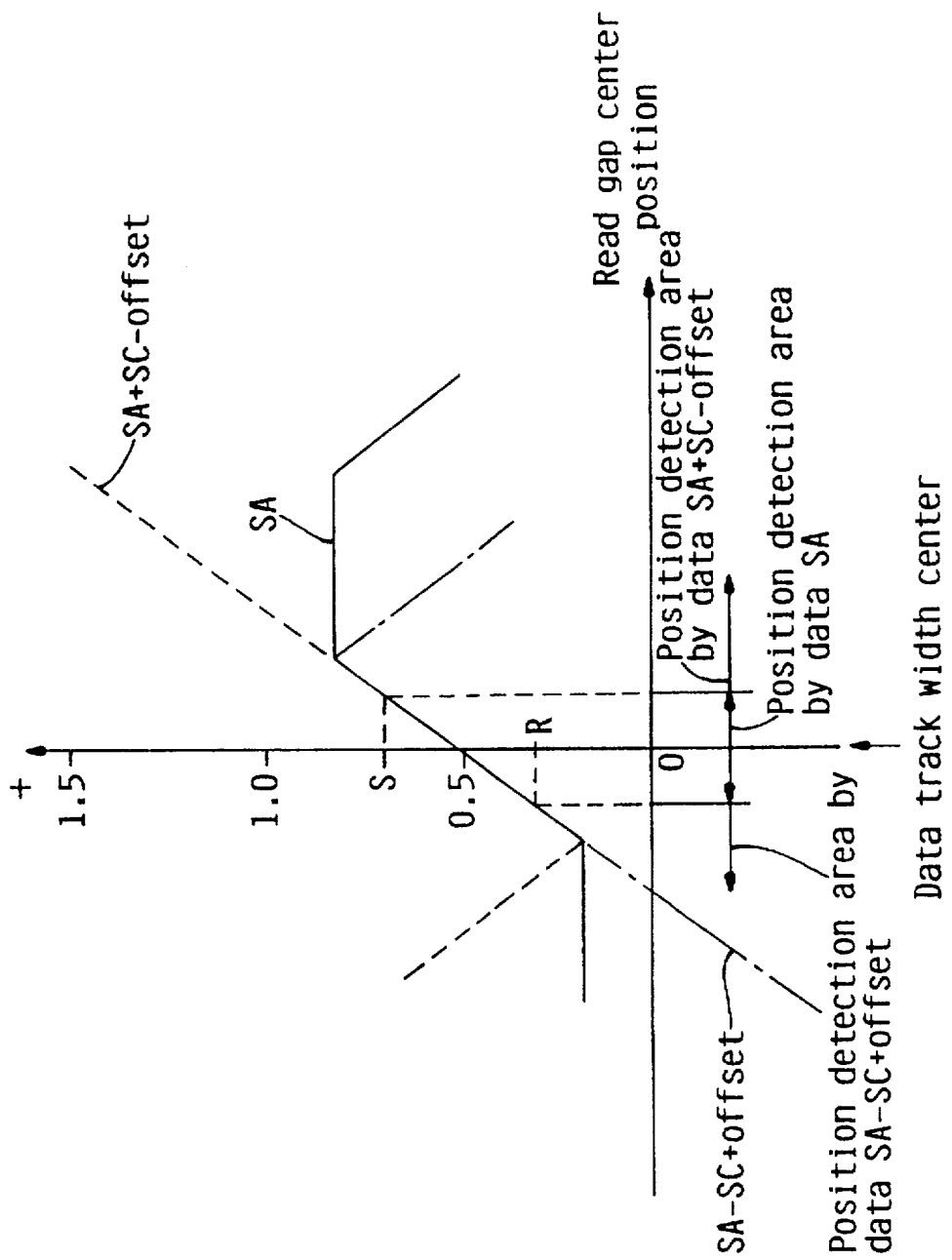
FIG. 6(B) is a diagram illustrating a position detection signal determined according to an embodiment of the present invention.

(see FIGS. 6(A) and 6(B)), is specified). If the condition tested for in step 110 is found, step 112 determines the position data which indicates the position of magnetic head 20 by the following equation (3):

$$\text{Position} = SA + SC - \text{offset} \qquad (3)$$

As shown in FIG. 6(A), data SA+SC differs from data SA in the area which varies linearly with respect to the movement of magnetic head 20, and by using this data, the position of magnetic head 20 can be detected over a wide range. However, there occurs a displacement of a1 of value between data SA and data SA+SC, this displacement a1 being equal to the offset of data SA and SC. Thus, as in equation (3), by using the data obtained by subtracting from data SA+SC the offset data determined by the interrupt routine shown in FIG. 8, a position detection signal is obtained which has no point of discontinuity with respect to data SA.

If the condition tested for in step 110 is not found, step 114 determines if data SA at the target position of magnetic head 20 is smaller than specified value R, which is <0.5, e.g., a value of approximately 0.3 (see FIGS. 6(A) and 6(B)). If this condition is found in step 114, step 116 determines the position data by the following equation (4), and the process goes to step 120.

$$\text{Position} = SA - SC + \text{offset} \qquad (4)$$

As shown in FIG. 6(A), data SA−SC differs from data SA and SA+SC in the area which varies linearly with respect to the movement of magnetic head 20, and by using this data, the position of magnetic head 20 can be detected over a further wide range. However, there occurs a displacement of value a2 between data SA and data SA−SC and displacement a2 is equal to the offset of data SA and SC. Thus, as in equation (4), by using the data obtained by adding the offset data to data SA−SC, a position detection signal is obtained which has no point of discontinuity with respect to data SA and varies linearly over a wider range as shown in FIG. 6(B).

If the condition tested for in step 114 is not found, then the position data is determined at step 118 by the following equation (5) and the process goes to step 120.

$$\text{Position} = SA \qquad (5)$$

Step 120 determines whether seek operation is being performed or not. If the magnetic head is operated to follow tracks so that it is aligned with a particular data track, then the condition in step 120 is not found, and step 122 provides control of track following so that magnetic head 20 is kept aligned with the particular data track based upon the position data.

When a seek operation is being performed, the condition in step 120 is met, and step 126 determines whether magnetic head 20 has reached the target position based upon the position data. This target position differs between information reading and writing. To read information, the position, at which the central portion of read gap 220A of magnetic head 20 is aligned with the widthwise central portion of the data track as the target of movement, is taken as the target position of magnetic head 20. To write information, the position, at which the central portion of write gap 20B of magnetic head 20 is aligned with the widthwise central portion of the data track as the target of movement, is taken as the target position. If the condition in step 126 is not met, seek operation continues.

If the condition tested for in step 126 is found, step 128 terminates seek operation by halting the movement of magnetic head 20 and initiating the read or write interrupt routine (not shown). This causes the central portion of read gap 20A or write gap 20B of magnetic head 20 to be aligned with the central portion of the width of data track as a target of movement. Then information will be read from or written to said data track.

Figure 9:
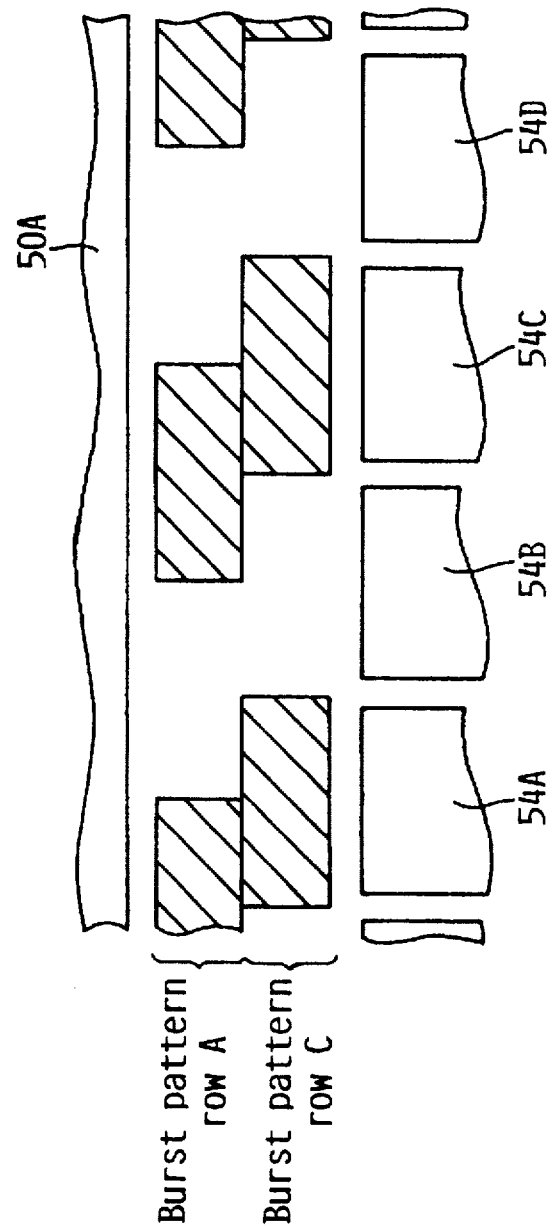
FIG. 9 is a top view of an alternative embodiment of the burst pattern.
Figure 10A:
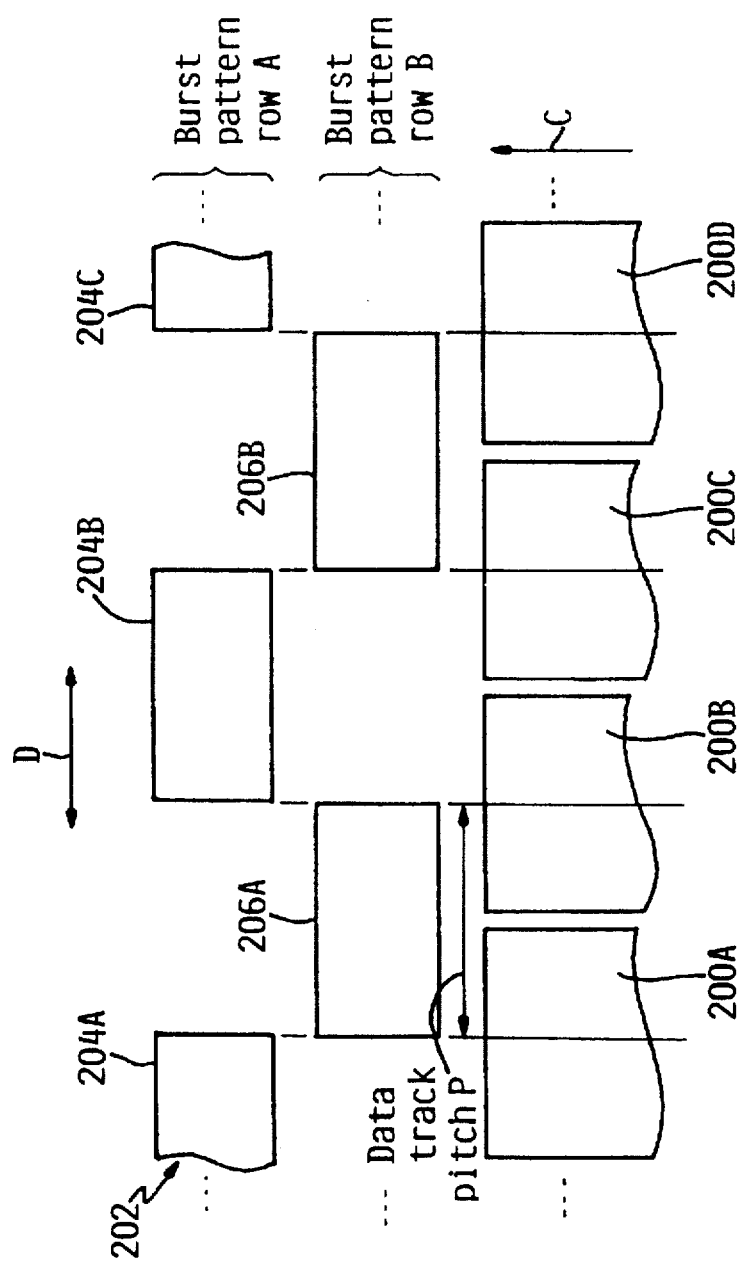
FIG. 10(A) is a top view of a conventional burst pattern consisting of two burst pattern rows recorded on the magnetic disk.
Figure 10B:
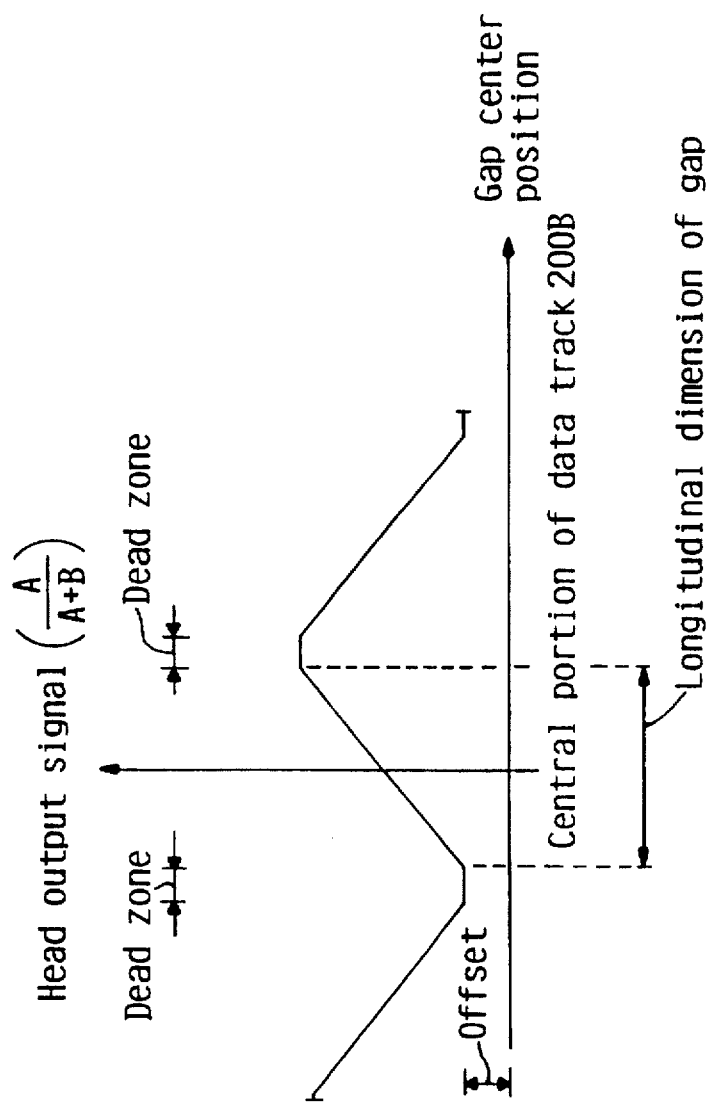
FIG. 10(B) is a diagram illustrating a signal being output from the magnetic head as the burst pattern is read while the magnetic head shown in FIG. 10(A) is moving.

In the embodiment described above, burst pattern rows A and B as a first burst pattern are recorded on disk 18 to generate signal A/(A+B), and burst pattern rows C and D as a second burst pattern are recorded to generate signal C/(C+D). However, it should be understood that the present invention is not limited to the specific application. Using two burst pattern rows for each of a first and second burst patterns is intended to normalize the level of the first and second signals. Therefore either one of burst pattern rows A and B or of burst pattern rows C and D may be recorded on disk 18. FIG. 9 shows a case of recording only burst pattern rows A and C on the disk. In this case, using signal A as a first signal together with signal C as a second signal, the gain adjustment pattern being recorded along the radial direction of the magnetic disk is read for normalization and for position detection of magnetic head 20 in the similar manner as described above.

For the position data indicating the position of magnetic head 20, the following equations (6) to (8) instead of equations (3) to (5) described above, may be used to obtain a position detection signal which varies linearly.

$$\text{Position} = SA + SC - (2 \times \text{offset}) \qquad (6)$$

$$\text{Position} = SA - SC \qquad (7)$$

$$\text{Position} = SA - \text{offset} \qquad (8)$$

Thus, in each equation, operating on data SA, data SA+SC, and data SA−SC so that the value varies only by the amount of offset, the resulting position detection signal will vary linearly over a wide range.

In the aforementioned embodiment, the offset data is determined in the offset adjustment routine so that it becomes equal to the minimum value of data SC. However, the offset data may be determine so that it becomes equal to the minimum value of data SA.

As discussed above, according to the present invention, one is able to detect the position of the magnetic head over a wide range. This is accomplished by using a magnetic disk where a plurality of data tracks are formed along a predetermined direction, and first and second burst patterns are recorded, the first burst pattern being formed of a plurality of recording areas arranged along the predetermined direction, in each of the recording areas a signal-recorded region being defined by first and second sides, the first side being disposed so as to correspond to the vicinity of the central portion of a first data track along the predetermined direction, the second side opposed to said first side and disposed so as to correspond to the vicinity of the central portion of a second data track adjacent to said first data track along the predetermined direction, the second burst pattern being formed of a plurality of recording areas arranged along the predetermined direction whose positions are offset by respective predetermined amounts, e.g., half of the pitch of a data track, in the predetermined direction with respect to the recording areas of the first burst pattern. The position of the magnetic head is detected by relative movement between the magnetic disk and magnetic head along the predetermined direction and by using: a portion, which varies linearly with respect to the relative movement, of a first signal which corresponds to the first burst pattern and which is output from the magnetic head; a portion, which varies linearly with respect to the relative movement, of a signal formed by adding the first signal and a second signal which corresponds to the second burst pattern and which is output from the magnetic head; and a portion, which varies linearly with respect to the relative movement, of a signal formed by subtracting the second signal from the first signal.

What is claimed is:

1. A method for detecting the position of a magnetic head, comprising the steps of:

moving a magnetic disk relative to said magnetic head, said magnetic head being capable of reading signals recorded on a plurality of data tracks of said magnetic disk, said plurality of data tracks being formed along a predetermined direction, said magnetic head also being capable of reading first and second burst patterns recorded on said magnetic disk, said first burst pattern having at least one first recording area arranged along said predetermined direction such that said first recording area has at least one boundary which substantially aligns with a central portion of every data track, said second burst pattern having at least one second recording area arranged along said predetermined direction such that said second recording area has boundaries which substantially align with the boundaries of every data track, said first recording area and said second recording area offset by respective predetermined amounts; and detecting the position of the magnetic head by selecting among a first portion, which varies linearly with respect to said relative movement, of a first signal being output from the magnetic head in response to said first burst pattern, a second portion, which varies linearly with respect to said relative movement, of a signal obtained by adding said first signal to a second signal being output from the magnetic head in response to said second burst pattern, a third portion, which varies linearly with respect to said relative movement, of a signal obtained by subtracting the second signal from the first signal;

detecting as an offset a minimum value of a level of at least one of said first and second signals which varies linearly with said relative movement between said magnetic disk and said magnetic head;

subtracting said offset from said signal obtained by adding the first signal to the second signal; and adding said offset to said signal obtained by subtracting the second signal from the first signal.

2. A magnetic disk device comprising:

a magnetic disk, on which first and second burst patterns are recorded, said first burst pattern having at least one first recording area arranged along said predetermined direction such that said first recording area has at least one boundary which substantially aligns with a central portion of every data track, said second burst pattern having at least one second recording area arranged along said predetermined direction such that said second recording area has boundaries which substantially align with the boundaries of every data track, said first recording area and said second recording area offset by respective predetermined amounts; and a magnetic head capable of reading signals recorded on the data track of the magnetic disk and also being capable of reading said first and second burst patterns recorded on the magnetic disk; and position detection means for detecting a position of the magnetic head by moving said magnetic disk relative to said magnetic head along said predetermined direction, and selectively using a first portion, which varies linearly with respect to said relative movement, of a first signal being output from the magnetic head in response to said first burst pattern, a second portion, which varies linearly with respect to said relative movement, of a signal obtained by adding said first signal to a second signal being output from the magnetic head in response to said second burst pattern, and a third portion, which varies linearly with respect to said relative movement, of a signal obtained by subtracting the second signal from the first signal;

offset detection means for detecting as an offset a minimum value of a level of at least one of said first and second signals which varies with the relative movement between said magnetic disk and said magnetic head, and said position detection means includes means for subtracting the offset detected by said detection means from said signal obtained by adding the second signal to the first signal, and for adding the offset detected by said detection means to said signal obtained by subtracting the second signal from the first signal.

3. A method of determining the position of a head in a storage device relative to a recording disk of the storage device, the storage disk having a plurality of data tracks extending in a circular direction around the recording disk, the head being adapted to move in a generally radial direction relative to the recording disk, the recording disk further having a first burst pattern having at least one first recording area arranged along said predetermined direction such that said first recording area has at least one boundary which substantially aligns with a central portion of every data track, said second burst pattern having at least one second recording area arranged along said predetermined direction such that said second recording area has boundaries which substantially align with the boundaries of every data track, said first recording area and said second recording area offset by respective predetermined amounts formed thereon and a second burst patterns formed thereon offset relative to the first burst pattern, the method comprising the steps of:

reading, using the head, the first burst pattern to produce a first signal, the first signal having a first portion which varies linearly with respect to movement of the head relative to the recording disk and a second portion which remains unchanged with respect to movement of the head relative to the recording disk;

reading, using the head, the second burst pattern to produce a second signal, the second signal having a first portion which varies linearly with respect to movement of the head relative to the recording disk and a second portion which remains unchanged with respect to movement of the head relative to the recording disk;

generating a third signal, representative of an addition of the first signal and the second signal, and a fourth signal, representative of a subtraction of the first signal and the second signal by determining a minimum value of at least one of the first signal and the second signal;

determining an offset value using the minimum value, adding the first signal to the second signal and subtracting the offset value to produce the third signal; and subtracting the second signal from the first signal and adding the offset value to produce the fourth signal; and determining the position of the head using respective signal portions of the first signal, the third signal and the fourth signal, the respective signal portions of the first signal, the third signal and the fourth signal each varying linearly with respect to movement of the head relative to the recording disk.

4. A method as recited in claim 3, wherein the determining step further comprises the steps of:

using the third signal when a value of the first signal is above a first predetermined threshold;

using the fourth signal when the value of the first signal is below a second predetermined threshold; and using the first signal when the value of the first signal is between the first predetermined threshold and the second predetermined threshold.

* * * * *